UNITED STATES PATENT OFFICE.

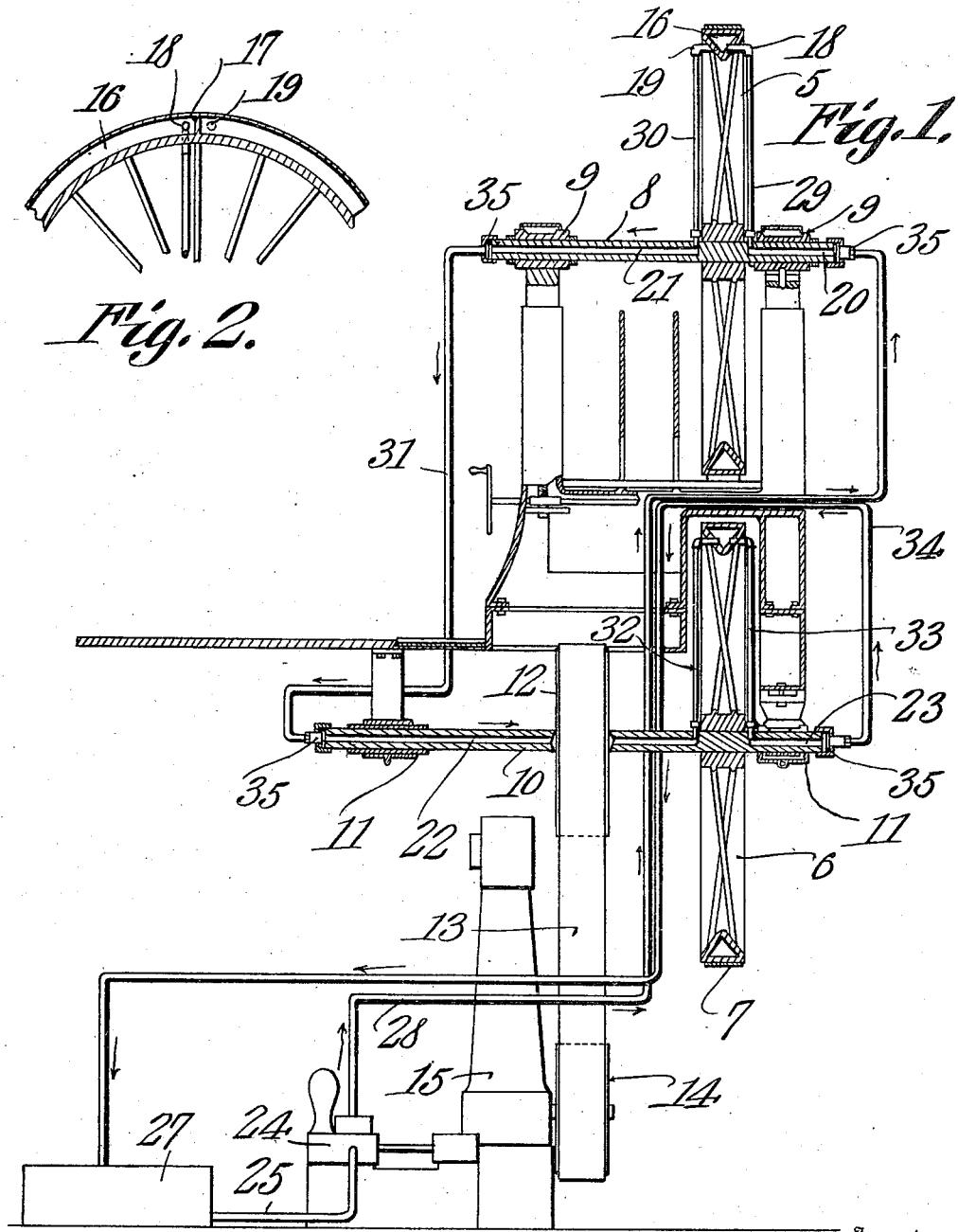

MILTON T. WERTENBAKER, OF PARKERSBURG, WEST VIRGINIA.

BAND-SAW WHEEL.

966,502. Specification of Letters Patent. Patented Aug. 9, 1910.

Application filed August 23, 1909. Serial No. 514,236.

*To all whom it may concern:*

Be it known that I, MILTON T. WERTENBAKER, a citizen of the United States, residing at Parkersburg, in the county of Wood and State of West Virginia, have invented a new and useful Band-Saw Wheel, of which the following is a specification.

This invention has for its object the provision of means for cooling the wheels of band-saws, as well as the bearings thereof, and to this end, it consists in a novel form of wheel which is characterized by a hollow rim, and a tubular shaft for said wheel, through which rim and shaft, cold water or some other cooling medium is caused to circulate, thereby cooling the wheel rim, the saw, and the bearings of the shafts, and thus keeping said parts in better running order.

Another object is to provide novel means for maintaining a circulation of the cooling medium between the upper and lower wheels of the saw.

The invention is illustrated in the accompanying drawing in which—

Figure 1 is an elevation of a band saw mill partly in section showing the application of the invention. Fig. 2 is the fragmentary view of one of the band wheels.

Referring to the drawing, 5 denotes the upper wheel, and 6 the lower wheel of the band saw 7. The upper wheel is mounted upon a shaft 8 journaled in bearings 9, and the lower wheel is mounted upon a shaft 10 journaled in bearings 11. On the shaft 10 is a pulley 12 which is connected by a belt 13 to a drive pulley 14 on the shaft of the engine 15. The rim of each wheel is made hollow to receive a cooling medium, such as water, and in the chamber 16 thus formed in the rim, is a partition 17. The cooling medium enters the chamber on one side of the partition, and flows out of the same on the opposite side thereof, inlet and outlet pipes 18 and 19, respectively entering the chamber adjacent to the partition, on opposite sides thereof. The shafts 8 and 10 are also provided with water passages extending axially through the shafts from the ends thereof. The passages of the shaft 8 are indicated at 20 and 21, respectively, and the passages of the shaft 10 at 22 and 23, respectively.

At 24 is indicated a pump for maintaining the circulation of the cooling water. The suction pipe 25 of the pump leads to a tank 27 containing a supply of water, and also a refrigerant for cooling the same. From the pump, a pipe 28 leads to the passage 20 with one end of which it communicates. To the other end of this passage is connected a pipe 29 which leads to the inlet pipe 18 of the rim of the wheel 5. To the outlet pipe 19 is connected a pipe 30 which leads to one end of the passage 21, with the other end of which, a pipe 31 communicates. The last mentioned pipe leads to and communicates with one end of the passage 22, the other end of this passage being connected by a pipe 32 to the inlet of the rim of the wheel 7. The outlet of this rim is connected by a pipe 33 to one end of the passage 23, and communicating with the other end of this passage is a pipe 34 which leads back to the tank 27.

By the herein described system of piping, the water is caused to circulate through the rims of the wheels, and the shafts, in the order named, the water being returned to the tank, in which it is cooled off, and used again, a continuous circulation being thus maintained. The water circulating through the rims and the shafts, chills the same, which keeps the saw and the shaft bearings cool. The tension of the saw can be better maintained by cooling it, and it will cut faster and straighter, and by cooling the bearings, less oil is required to lubricate the same. The pipes 29, 30, 32, and 33 are made fast to the shafts and to the wheels, and turned therewith. The pipes 28, 31, and 34 are stationary and are connected to the shafts axially at the ends thereof by suitable swivel joints 35 so that the shafts are left free to rotate. Stuffing boxes are provided to prevent leakage. In cold weather, warm air or water may be circulated through the wheel rims which will keep the sawdust from freezing thereon. In localities having water service, the pump may be dispensed with, and the pipe 28 connected to the water main, and the pipe 34 to a waste pipe, the water then circulating through the parts by the pressure in the main.

What is claimed is:—

1. A band saw wheel having a hollow rim, and means for introducing a tempering medium thereinto.

2. A band saw wheel having a hollow rim, a partition therein, means for introducing a tempering medium into the rim on one side of the partition, and an outlet for said medium on the other side of the partition.

3. The combination of a shaft having axial passages entering the same through opposite ends, a wheel carried by the shaft, and having a hollow rim, connections between the rim and the passages of the shaft, and means for circulating a tempering medium through the passages and the rim.

4. The combination of a shaft having axial passages entering the same through opposite ends, a wheel carried by the shaft, and having a hollow rim containing a partition, a connection between one of the passages and the rim on one side of the partition, a connection between the other passage and the rim on the other side of the partition, and means for circulating a tempering medium through the passages and the rim.

5. The combination of a shaft having axial passages entering the same through opposite ends, a wheel carried by the shaft, and having a hollow rim, connections between the rim and the passages of the shaft, and means for circulating a tempering medium through the passages and the rim, said means comprising a pump having its outlet connected to one of the passages, a tank to which the pump inlet is connected, and a connection between the other passage and the tank.

6. The combination of a pair of band saw wheels having a hollow rim, shafts on which the wheels are mounted, each of said shafts having axial passages entering the same through opposite ends, a pump having its outlet connected to one of the passages of one of the shafts, a connection between said passage and the rim of the wheel of said shaft, a connection between said rim and the other passage of the shaft, a connection between the last-mentioned passage and one of the passages of the other shaft, a connection between the last-mentioned passage and the rim of the wheel of the last-mentioned shaft, a connection between the last-mentioned rim and the other passage of the last-mentioned shaft, and a connection between the last-mentioned passage and the pump inlet.

7. The combination with a shaft having axial passages, bearings supporting the shaft, said bearings engaging that portion of the shaft having the passages, a wheel carried by the shaft, and having a hollow rim, connections between the rim and the passages of the shaft, and means for circulating a tempering medium through the passages and the rim.

In testimony that I claim the foregoing as my own, I have hereto affixed my signature in the presence of two witnesses.

MILTON T. WERTENBAKER.

Witnesses:
 JAS. TAYLOR,
 HARRY E. DIETZ.